US008850604B2

(12) United States Patent
Nishimura

(10) Patent No.: US 8,850,604 B2
(45) Date of Patent: *Sep. 30, 2014

(54) CONTENT RECEIVER, LICENSE SERVER, CONTENT UTILIZATION SYSTEM, AND CONTENT VIEWING TIME LIMIT MANAGEMENT METHOD

(75) Inventor: Takuya Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,851

(22) Filed: Sep. 12, 2012

(65) Prior Publication Data

US 2013/0019322 A1 Jan. 17, 2013

Related U.S. Application Data

(63) Continuation of application No. PCT/JP2010/006815, filed on Nov. 22, 2010.

(30) Foreign Application Priority Data

Apr. 8, 2010 (JP) .................................. 2010-089701

(51) Int. Cl.
*G06F 21/22* (2006.01)
*G06F 21/10* (2013.01)

(52) U.S. Cl.
CPC ...................................... *G06F 21/10* (2013.01)
USPC ............................................ 726/29; 726/26

(58) Field of Classification Search
CPC ............................. G06F 21/10; H04N 21/4334
USPC .......................................... 726/29, 26; 725/9
See application file for complete search history.

(56) References Cited

U.S. PATENT DOCUMENTS

| 2004/0228487 A1* | 11/2004 | Maeda et al. .................. 380/232 |
| 2005/0149340 A1* | 7/2005 | Murakami et al. ................. 705/1 |
| 2006/0053232 A1* | 3/2006 | Onoda et al. ................... 709/246 |

(Continued)

FOREIGN PATENT DOCUMENTS

| JP | 10-207779 | 8/1998 |
| JP | 2003-122643 | 4/2003 |

(Continued)

OTHER PUBLICATIONS

International Search Report issued Dec. 28, 2010 in International Application No. PCT/JP2010/006815.

*Primary Examiner* — Beemnet Dada
*Assistant Examiner* — J. Brant Murphy
(74) *Attorney, Agent, or Firm* — Wenderoth, Lind & Ponack, L.L.P.

(57) ABSTRACT

A license receiver comprises a viewing license invalidating unit which invalidates a viewing license of a content a viewing time limit of which is not determined, and a first control unit. When the first control unit reproduces the content, (i) if the viewing license is valid, the first control unit determines the viewing time limit, and (ii) if the viewing license is invalid, the first control unit transmits a viewing license request including a request of determining viewing time limit, to the license server, and receives the determined viewing time from the license server. When the first control unit writes out the content to an exchangeable medium before reproducing the content, if the viewing license is valid, the first control unit invalidates the viewing license and writes out the non-determined viewing time limit to the exchangeable medium.

9 Claims, 10 Drawing Sheets

(56) References Cited

U.S. PATENT DOCUMENTS

| | | | |
|---|---|---|---|
| 2007/0150967 A1* | 6/2007 | Takahashi | 726/31 |
| 2008/0307533 A1* | 12/2008 | Hanai | 726/30 |
| 2009/0024521 A1* | 1/2009 | Lim | 705/40 |
| 2009/0187762 A1 | 7/2009 | Okamoto et al. | |
| 2010/0046918 A1* | 2/2010 | Takao et al. | 386/95 |
| 2010/0100565 A1* | 4/2010 | Adachi | 707/781 |
| 2011/0067111 A1* | 3/2011 | Nishimura | 726/26 |
| 2011/0110516 A1* | 5/2011 | Satoh | 380/201 |
| 2011/0289594 A1* | 11/2011 | Shibata et al. | 726/26 |

FOREIGN PATENT DOCUMENTS

| | | |
|---|---|---|
| JP | 2004-21479 | 1/2004 |
| JP | 2004-227282 | 8/2004 |
| JP | 2005-165963 | 6/2005 |
| WO | 2010/021147 | 2/2010 |

\* cited by examiner

FIG. 2(A)
_700_

| LICENSE TYPE | 0x10 |
|---|---|
| CONTENT ID | 0x1242A4 |
| PACK ID | 0x1812 |
| DECRYPTION KEY | 0xABCDCBA |
| VIEWING TERM | (N.A.) |
| VIEWING TIME LIMIT START | 2010/1/31/12:00 |
| VIEWING TIME LIMIT END | 2010/2/1/12:00 |

FIG. 2(B)
_701_

| LICENSE TYPE | 0x11 |
|---|---|
| CONTENT ID | 0x1242A4 |
| PACK ID | 0x1812 |
| DECRYPTION KEY | 0xABCDCBA |
| VIEWING TERM | 48 HOURS |
| VIEWING TIME LIMIT START | (N.A.) |
| VIEWING TIME LIMIT END | (N.A.) |

FIG. 2(C)
_710_

| LICENSE TYPE | 0x12 |
|---|---|
| CONTENT ID | 0x1242A4 |
| PACK ID | 0x1812 |
| DECRYPTION KEY | 0xABCDCBA |
| VIEWING TERM | (N.A.) |
| VIEWING TIME LIMIT START | 2010/1/31/12:00 |
| VIEWING TIME LIMIT END | 2010/2/1/12:00 |
| MEDIA TYPE | SD CARD |

FIG. 2(D)
_712_

| LICENSE TYPE | 0x13 |
|---|---|
| CONTENT ID | 0x1242A4 |
| PACK ID | 0x1812 |
| DECRYPTION KEY | 0xABCDCBA |
| VIEWING TERM | 48 HOURS |
| VIEWING TIME LIMIT START | (N.A.) |
| VIEWING TIME LIMIT END | (N.A.) |
| MEDIA TYPE | SD CARD |

| # | CONTENT ID 705 | PACK ID 714 | DECRYPTION KEY 702 | VIEWING TERM 703 | VIEWING TIME LIMIT START 704 | VIEWING TIME LIMIT END 704 | VALID/INV ALID FLAG 808 |
|---|---|---|---|---|---|---|---|
| 1 | 0x121123 | (N.A.) | ABCA3AF | (N.A.) | 2010/1/31/12:00 | 2010/2/1/12:00 | VALID |
| 2 | 0x8A3BC1 | 0xABA8 | F83AD4E | 48 HOURS | (N.A.) | (N.A.) | VALID |
| 3 | 0xAAF1AB | 0x123A | 4E89AC | (N.A.) | 2010/2/3/12:00 | 2010/2/5/12:00 | VALID |
| 4 | 0X1893AB | 0xABA8 | 29A8CBF | 48 HOURS | (N.A.) | (N.A.) | VALID |
| : | : | : | : | : | : | : | : |

| # | CONTENT ID 705 | PACK ID 714 | DECRYPTION KEY 702 | VIEWING TERM 703 | VIEWING TIME LIMIT START 704 | VIEWING TIME LIMIT END 704 |
|---|---|---|---|---|---|---|
| 1 | 0x121123 | (N.A.) | ABCA3AF | (N.A.) | 2010/1/31/12:00 | 2010/2/1/12:00 |
| 2 | 0x8A3BC1 | 0xABA8 | F83AD4E | 48 HOURS | (N.A.) | (N.A.) |
| 3 | 0xAAF1AB | 0x123A | 4E89AC | (N.A.) | 2010/2/3/12:00 | 2010/2/5/12:00 |
| 4 | 0X1893AB | 0xABA8 | 29A8CBF | 48 HOURS | (N.A.) | (N.A.) |
| : | : | : | : | : | : | : |

CONTENT RECEIVER, LICENSE SERVER, CONTENT UTILIZATION SYSTEM, AND CONTENT VIEWING TIME LIMIT MANAGEMENT METHOD

CROSS-REFERENCE TO RELATED APPLICATIONS

This application is a continuation application of PCT International Patent Application No. PCT/JP2010/006815 filed Nov. 22, 2010, claiming the benefit of priority of Japanese Patent Application No. 2010-089701 filed Apr. 8, 2010, all of which are incorporated by reference herein in their entirety.

BACKGROUND OF THE INVENTION

1. Field of the Invention

The present invention relates to a content receiver, a license server, a content utilization system, a content viewing time limit management method, and the like for copying and bringing out an encrypted content with managed viewing time limit from a content receiver to an exchangeable medium to reproduce the encrypted content by a reproducer.

2. Related Art of the Invention

In recent years, owing to the development of the Internet, techniques for downloading and reproducing movies, music, and the like are generally used. A large number of services are provided for downloading, through networks, contents from servers, which perform content delivery of movies, music, and the like, to PCs, AV apparatuses, cellular phones, and portable apparatuses.

In such content delivery services, there are content sales of a sell-off type with which a user can permanently view purchased content and rental sales with which a user can view downloaded content within a limited viewing expiration time.

In typical content sales of a download type, a content provider which supplies content operates a content server and a DRM server, and a content receiver on a viewer side downloads an encrypted rental content from the content server and acquires, from the DRM server, a decryption key for the encrypted content and viewing conditions for the content. The viewing conditions for the content include information concerning a viewing expiration time within which a user is permitted to view the content and a copy condition for the content.

When the content receiver reproduces the rental content, the content receiver refers to a viewing expiration time designated from the DRM server. If the viewing expiration time has not expired, the content receiver starts reproduction of the content and, if the viewing expiration time has expired, the content receiver carries out deletion of the content.

In some cases, the content receiver writes out a rental content to an exchangeable medium such as an SD card together with the viewing expiration time. In this case, when a reproduction terminal for the SD card starts to reproduce a rental content or has ended the reproduction of the content, the reproduction terminal checks the viewing expiration time for the content, and deletes the content if the viewing expiration time has expired. As a method of reproducing content with viewing period of this type, for example, there is a method described in Patent Document 1 (Japanese Patent Application Laid-Open No. 2004-227282).

FIG. 10 is a sequence diagram for a terminal that has downloaded a content from a server and moves the content so that the content is viewed in another terminal in conventional content downloading as described in Patent Document 1.

A download terminal 601 can view a content by storing the content distributed from a server 600 and acquiring a viewing license of the content from the server 600.

To allow the content to be viewed in another viewing terminal 602, the content can be moved from the download terminal 601 to the viewing terminal 602. However, the server 600 manages the viewing license in association with the download terminal 601. Therefore, the viewing terminal 602, which is another terminal, must acquire a viewing license by itself from the server 600 to view the content.

Regarding the forms of the viewing license to be provided, there are (i) a viewing license with viewing time limit for providing a reproduction permission condition of the target content by designating absolute date and time, and (ii) a viewing license with viewing term such that absolute date and time is not designated when the license is provided and only a viewable period, such as 48 hours, is designated for determining the viewing time limit upon the first viewing on the terminal.

Regarding the forms of selling a rental content, there is what is called pack selling. The pack selling provides, for example, all twelve episodes of a TV drama as one content group, or as a package, where the twelve episodes are provided at a lower price than the episodes to be individually purchased.

In this case, the price for the service paid by the user to the service provider is lower. But the viewing time limits of all the pack contents are usually unified. Specifically, in a case where the viewing license with viewing term is acquired at the time of the download of the contents, the viewing time limits of all twelve contents are set to the same date and time when viewing of any one of the contents is started after the download of the twelve contents.

However, in the above conventional technique, there is a problem that the viewing time limits of the contents cannot be unified as to a terminal that has written out the contents and a portable terminal when the rental content is written out, without a determined viewing time limit, to an exchangeable medium such as an SD card to be viewed by the portable terminal and the like.

This problem will be described below.

FIG. 11 is a sequence diagram for a terminal that has downloaded a content from a server to copy the content so that the content is viewed in another terminal in conventional content downloading.

When the download terminal 601 has never reproduced the stored content yet, which has been distributed from the server 600, and the content is brought out by copying to the SD card or the like, the viewing time limit of the content recorded in the SD card is not determined yet. Therefore, when the viewing terminal 602 starts to reproduce the content recorded in the SD card, the time limit of the content recorded in the SD card is determined.

On the other hand, in a case in which a content stored in the HDD in the download terminal 601 is viewed for the first time at the download terminal 601, the viewing time limit of the content stored in the HDD is determined when the first viewing is started.

With regard to the same content, because the time point at which the viewing of the content is started at the download terminal 601 differs from the time point at which the viewing of the content is started at the viewing terminal 602, the viewing time limit of the content stored in the HDD in the download terminal 601 differs from the viewing time limit of the content recorded in the SD card.

When some contents of the pack contents are brought by recording in the exchangeable medium, a similar problem occurs such that the viewing time limits differ as to contents in the same pack.

FIG. 12 is a sequence diagram, in which the download terminal 601 that has received pack rental content from the server 600 writes out some of the contents of the pack to an SD card 606, and the viewing terminal 602 starts to view the content on the SD card 606.

An HDD 605 of the server 600 stores twelve contents with content numbers 1 to 12 in a pack. A case will be considered in which the download terminal 601 downloads nine contents with content numbers 1 to 9 of the twelve contents and writes out (moves) five contents with content numbers 1 to 5 to the SD card 606.

If none of the contents with content numbers 1 to 9 has been viewed in the download terminal 601 before the contents are written out to the SD card 606, the viewing time limits of all contents with content numbers 1 to 12 are not determined yet and, for example, a viewing term is only designated e.g., the contents can be viewed during 48 hours from the first viewing. When any of the contents with content numbers 6 to 9, which are left in the download terminal 601, is viewed at the download terminal 601, it is decided that the period for the viewing time limit of the content is 48 hours from that time. Therefore, the viewing time limits of all contents with content numbers 1 to 12 need to be determined so as to be synchronous with the content.

However, the contents with content numbers 1 to 5 that have been brought out by the SD card 606 are under the management of the viewing terminal 602, and the download terminal 601 has no means to determine the viewing time limits of the contents with content numbers 1 to 5. The download terminal 601 also has no means to determine the viewing time limits of the contents with content numbers 10 to 12 that are not yet downloaded to the download terminal 601.

After that, when any of the contents with content numbers 1 to 5 in the SD card 606 is viewed at the viewing terminal 602, it is decided that the period for the viewing time limit of the content is 48 hours from the time of the viewing start in the viewing terminal 602. Consequently, this determined time limit differs from the time limit of the content (the above content of the contents with content numbers 6 to 9) which has been already viewed at the download terminal 601.

In consideration of the above-described conventional problems, an object of the present invention is to provide a content receiver, a license server, a content utilization system, a content viewing time limit management method, and the like capable of synchronizing viewing time limits of a plurality of contents even if some of the plurality of contents that need to have the same viewing time limits are written out to an exchangeable medium before the viewing time limits are determined.

SUMMARY OF THE INVENTION

The $1^{st}$ aspect of the present invention is a content receiver that receives a content, for which a viewing time limit is managed, from a content server and that writes out the content to an exchangeable medium, the content receiver comprising:

a viewing license invalidating unit that invalidates a viewing license of the content; and a first control unit that writes out the content to the exchangeable medium, and reproduces the content, wherein when the first control unit writes out the content to the exchangeable medium, the first control unit causes the viewing license invalidating unit to invalidate a viewing license, and writes out a non-determined viewing time limit to the exchangeable medium if the viewing license, the viewing time limit of which is not determined, is held in a valid state, and thereafter when the first control unit reproduces the content, the first control unit transmits a viewing license request including a request of determining a viewing time limit, to the license server, receives a determined viewing time and the viewing license from the license server, and reproduces the content.

The $2^{nd}$ aspect of the present invention is the content receiver according to the $1^{st}$ aspect of the present invention, wherein when the first control unit writes out the content to the exchangeable medium before reproducing the content, (i) if the viewing license, the viewing time limit of which is not determined, is valid, the first control unit causes the viewing license invalidating unit to invalidate the viewing license, and writes out the non-determined viewing time limit to the exchangeable medium, and (ii) if the viewing license, the viewing time limit of which is not determined, is invalid, the first control unit writes out the non-determined viewing time limit to the exchangeable medium, and when the first control unit reproduces the content, (i) if the viewing license, the viewing time limit of which is not determined, is valid, the first control unit determines the viewing time limit by setting up a present time as a starting time, and thereafter when the first control unit writes out the content to the exchangeable medium, the first control unit writes out the determined viewing time limit to the exchangeable medium, and (ii) if the viewing license, the viewing time limit of which is not determined, is invalid, the first control unit transmits the viewing license request including the request of determining viewing time limit, to the license server, and receives the determined viewing time and the viewing license from the license server, and thereafter when the first control unit writes out the content to the exchangeable medium, the first control unit writes out the received and determined viewing time limit to the exchangeable medium.

The $3^{rd}$ aspect of the present invention is the content receiver according to the $2^{nd}$ aspect of the present invention, wherein in a content reproducer which reads the content and the viewing time limit of the content recorded on the exchangeable medium, (i) when a second control unit judges that the viewing time limit of the content to be reproduced, is determined, the second control unit controls the reproduction of the content according to the determined viewing time limit, (ii) when the second control unit judges that the viewing time limit is not determined, the second control unit transmits the viewing license request including the request of determining viewing time limit, to the license server, receives the determined viewing time limit from the license server and controls the reproduction of the content according to the received and determined viewing time limit, and in the license server which receives the viewing license request, (iii) when the viewing time limit of the content to be reproduced is not determined yet, the license server determines the viewing time limit and returns the determined viewing time limit to a transmission source of the viewing license request, and (iv) when the viewing time limit of the content to be reproduced is determined already, the license server returns the already determined viewing time limit to the transmission source of the viewing license request.

The 4th aspect of the present invention is the content receiver according to the 3rd aspect of the present invention, wherein the content belongs to a predetermined content group, (i) when the first control unit invalidates the viewing license of the content, the first control unit invalidates a viewing license of other content which belongs to the predetermined content group, and (ii) when the first control unit determines the viewing time limit of the content, the first control unit sets a viewing time limit as same as that of the content, to other content which belongs to the predetermined content group in the content receiver, (iii) when the first control unit receives the already determined viewing time limit from the license server, the first control unit sets a viewing time limit as same as the already determined viewing time limit to other content which belongs to the predetermined content group in the content receiver, when the content reproducer receives the determined viewing time limit from the license server, if other content which belongs to a content group to which a content corresponding to the determined viewing time limit belongs, is recorded on the exchangeable medium, the content reproducer records the determined viewing time limit to the other content, and when the license server determines the viewing time limit of the content to be reproduced, the license server sets up a viewing time limit as same as the determined viewing time limit, to other content which belongs to a content group to which a content corresponding to the determined viewing time limit, belongs.

The 5th aspect of the present invention is the content receiver according to the 3rd aspect of the present invention, wherein the first control unit in the content receiver and the second control unit in the content reproducer are operable to transmit a determination inquiry request which inquires whether the viewing time limit is determined in the license server, to the license server, about the content the viewing time limit of which is not determined.

The 6th aspect of the present invention is the content receiver according to the 2nd aspect of the present invention, wherein the invalidation of the viewing license of the content, the viewing time limit of which is not determined, by the license invalidating unit, denotes discard of the viewing license, and when the first control unit reproduces the content, if the viewing license is discarded, the first control unit controls so that the viewing license is acquired from the license server, the content encrypted is decrypted by using a decryption key included in the viewing license and the content is reproduced.

The 7th aspect of the present invention is a license server that supplies a viewing license according to each viewing license request, from a content receiver which receives a content for which a viewing time limit is managed, from a content server and writes out the content to an exchangeable medium, or from a content reproducer which reproduces the content recorded on the exchangeable medium, the license server comprising:

a viewing time limit setting unit; and a license transmit unit, wherein when the license server receives the viewing license request including a request of determining viewing time limit of the content, the viewing time limit of which is not determined, (i) if the viewing time limit of the requested content is not determined yet, the viewing time limit setting unit determines the viewing time limit by setting up a present time as a starting time and sets the determined viewing time limit, and (ii) if the viewing time limit of the requested content is determined already, the viewing time limit setting unit sets the already determined viewing time limit, the license transmit unit returns the viewing license and the viewing time limit set by the viewing time limit setting unit, to a transmission source of the viewing license request, and when the viewing time limit setting unit determines the viewing time limit by setting up the present time as the starting time, if the content belongs to a predetermined content group, the viewing time limit setting unit sets up a viewing time limit as same as the determined viewing time limit of the content, to other content which belongs to the predetermined content group.

The 8th aspect of the present invention is the license server according to the 7th aspect of the present invention, wherein when the license server receives a determination inquiry request from the content receiver or the content reproducer, (i) if the viewing time limit of the requested content is not determined yet, the license transmit unit returns information that the viewing time limit is not determined, to a transmission source of the determination inquiry request, and (ii) if the viewing time limit of the requested content is determined already, the license transmit unit returns the already determined viewing time limit, to the transmission source.

The 9th aspect of the present invention is a content utilization system comprising:

a content receiver that receives a content, a viewing time limit of which is managed, from a content server and that writes out the content to an exchangeable medium;

a content reproducer that reproduces the content recorded on the exchangeable medium; and a license server that supplies a viewing license of the content, wherein (1) the content receiver includes a viewing license invalidating unit that invalidates the viewing license of the content the viewing time limit of which is not determined, and a first control unit, when the first control unit reproduces the content, (i) if the viewing license is valid, the first control unit determines the viewing time limit by setting up a present time as a starting time, and thereafter when the first control unit writes out the content to the exchangeable medium, the first control unit writes out the determined viewing time limit to the exchangeable medium, and (ii) if the viewing license is invalid, the first control unit transmits a viewing license request including the request of determining viewing time limit, to the license server, and receives the determined viewing time and the viewing license from the license server, and thereafter when the first control unit writes out the content to the exchangeable medium, the first control unit writes out the received and determined viewing time limit to the exchangeable medium, when the first control unit writes out the content to the exchangeable medium before reproducing the content, (i) if the viewing license is valid, the first control unit invalidates the viewing license and writes out the non-determined viewing time limit to the exchangeable medium, and (ii) if the viewing license is invalid, the first control unit writes out the non-determined viewing time limit to the exchangeable medium, (2) the content reproducer includes a read-out unit which reads the content and the viewing time limit of the content that are recorded on the exchangeable medium, a time limit determination judgment unit which judges whether the viewing time limit of the content read by the read-out unit has been determined or not, and a second control unit, when the time limit determination judgment unit judges that the viewing time limit of the content is determined, the second control unit controls the reproduction of the content according to the determined viewing time limit, when the time limit determination judgment unit judges that the viewing time limit is not determined, the second control unit transmits the viewing license request including the request of determining viewing time limit, to the license server, receives the determined viewing time limit from the license server and controls the reproduction of the content according to the received and determined viewing time limit, and (3) the license server includes a viewing time limit setting unit and a license transmit unit, when the license server receives the viewing license request, (i) if the viewing time limit of the requested content is not determined yet, the viewing time limit setting unit determines the viewing time limit by setting up a present time as the starting time and sets the determined viewing time limit, and (ii) if the viewing time limit of the requested content is determined already, the viewing time limit setting unit sets the already determined viewing time limit, and the license transmit unit returns the viewing license and the viewing time limit set by the viewing time limit setting unit, to a transmission source of the viewing license request.

The $10^{th}$ aspect of the present invention is a content viewing time limit management method of a content utilization system comprising: a content receiver that receives a content, a viewing time limit of which is managed, from a content server and that writes out the content to an exchangeable medium; a content reproducer that reproduces the content recorded on the exchangeable medium; and a license server that supplies a viewing license of the content, the content viewing time limit management method comprising:

a step where when the content receiver having the viewing license of the content, a viewing time limit of which is not determined, reproduces the content, the content receiver determines the viewing time limit by setting up a present time as a starting time, thereafter when the content receiver writes out the reproduced content to the exchangeable medium, the content receiver writes out the determined viewing time limit to the exchangeable medium, and thereafter when the reproducer reproduces the content which is written out to the exchangeable medium, the reproducer controls the reproduction of the content according to the determined viewing time limit recorded on the exchangeable medium; and another step where when the content receiver having the viewing license of the content, a viewing time limit of which is not determined, writes out the content to the exchangeable medium before reproducing the content, the content receiver invalidates the viewing license and writes out the non-determined viewing time limit to the exchangeable medium, thereafter (1) when the content receiver reproduces the content, the content receiver transmits a viewing license request including a request of determining viewing time limit, to the license server, and (i) if the viewing time limit is not determined, the license server determines the viewing time limit and returns the determined viewing time limit to the content receiver, and (ii) if the viewing time limit is determined already, the license server returns the already determined viewing time limit to the content receiver, and (2) when the content reproducer reproduces the content which is written out to the exchangeable medium, the content reproducer transmits the viewing license request including the request of determining viewing time limit, to the license server, and (i) if the viewing time limit is not determined, the license server determines the viewing time limit and returns the determined viewing time limit to the content reproducer, and (ii) if the viewing time limit is determined already, the license server returns the already determined viewing time limit to the content reproducer.

The $11^{th}$ aspect of the present invention is a non-transitory computer-readable medium having a program stored thereon, wherein the program causes a computer to execute functions of the content receiver according to the $2^{nd}$ aspect of the present invention.

The present invention can provide a content receiver, a license server, a content utilization system, a content viewing time limit management method, and the like capable of synchronizing viewing time limits of a plurality of contents even if some of the plurality of contents that need to have the same viewing time limits are written out to an exchangeable medium before the viewing time limits are determined.

BRIEF DESCRIPTION OF THE DRAWINGS

FIG. 2(A) is a schematic diagram showing a viewing license with viewing time limit including information on a determined viewing time limit according to the first embodiment of the present invention;

FIG. 2(B) is a schematic diagram showing a viewing license with viewing term including information on a viewing time limit that has not been determined according to the first embodiment of the present invention;

FIG. 2(C) is a schematic diagram showing a writing license with viewing time limit including information on a determined viewing time limit according to the first embodiment of the present invention;

FIG. 2(D) is a schematic diagram showing a writing license with viewing term including information on a viewing time limit that has not been determined according to the first embodiment of the present invention;

FIG. 3 is a diagram showing a download content list on an HDD of a download terminal according to the first embodiment of the present invention;

FIG. 4 is a diagram showing a download content list on an SD card according to the first embodiment of the present invention;

DESCRIPTION OF SYMBOLS

Figure 1:
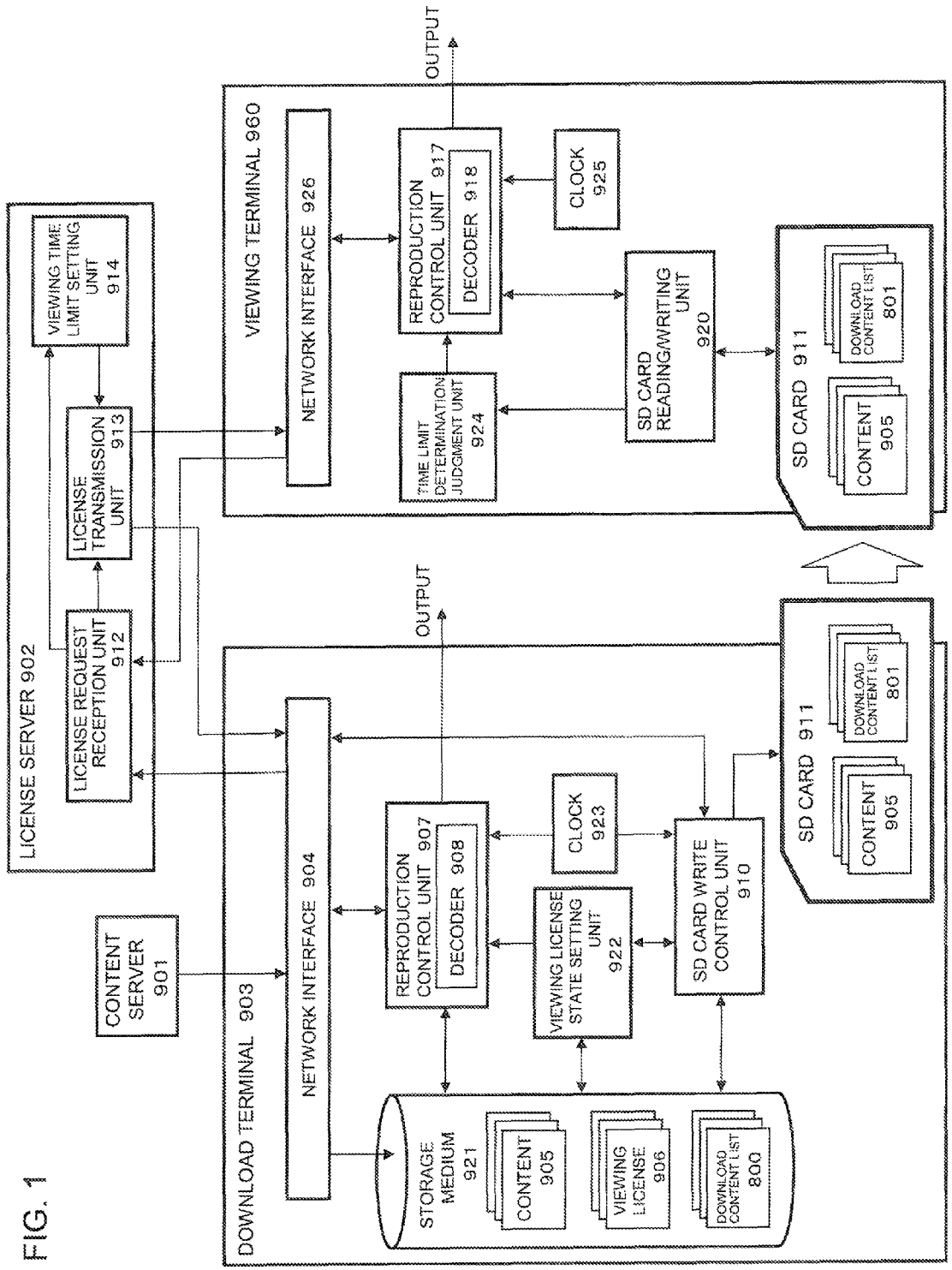
FIG. 1 is a block diagram of a content utilization system according to a first embodiment of the present invention.

600 Server
601 Download terminal
602 Viewing terminal
605 HDD
606 SD card
700 Viewing license with viewing time limit
701 Viewing license with viewing term
702 Decryption key
703 Viewing term
704 Viewing time limit
705 Content ID
710 Writing license with viewing time limit
711 Media type
712 Writing license with viewing term
713 License type
714 Pack ID
800 Download content list
801 Download content list
808 Valid/Invalid flag
901 Content server
902 License server
903 Download terminal
904 Network interface
905 Content
906 Viewing license
907 Reproduction control unit
908 Decoder
910 SD card write control unit
911 SD card
912 License request reception unit
913 License transmission unit
914 Viewing time limit setting unit
917 Reproduction control unit
918 Decoder
920 SD card reading/writing unit
921 Storage medium
922 Viewing license state setting unit
923 Clock
924 Time limit determination judgment unit
925 Clock
926 Network interface
960 Viewing terminal

PREFERRED EMBODIMENTS OF THE INVENTION

Embodiments of the present invention are described below with reference to the drawings.
(First Embodiment)
FIG. 1 is a block diagram of a content utilization system according to a first embodiment of the present invention.

A download terminal 903 is connected to a content server 901 and a license server 902 through the Internet (not shown). A viewing terminal 960 is connected to the license server 902 through the Internet.

A network interface 904 of the download terminal 903 downloads an encrypted content from the content server 901, to which the network interface 904 is connected through the Internet, to store the encrypted content as content 905 in a storage medium 921, such as an HDD, and further acquires a viewing license of the downloaded contents 905 from the license server 902 to store the viewing license as a viewing license 906.

When reproduction of one of the contents stored in a storage medium 921 is instructed thorough an instruction from the user (not shown), a reproduction control unit 907 checks viewing conditions of the target content. When the reproduction control unit 907 judges that the target content can be reproduced, the reproduction control unit 907 sets a content decryption key to a decoder 908, reads out the encrypted content 905, and starts decryption and reproduction.

When checking the viewing conditions, the reproduction control unit 907 acquires a viewing time limit of the target content from a download content list 800 and compares the viewing time limit with the present time acquired from a clock 923 to judge whether the viewing time limit is over. When the viewing time limit is not over, the reproduction control unit 907 judges that the content can be reproduced.

An SD card write control unit 910, based on an instruction from the user (not shown), copies some or all of the contents 905 stored in the storage medium 921 to an SD card 911, and records a download content list 801 related to the contents to the SD card 911.

The SD card 911 including the contents 905 written out by the download terminal 903 is inserted to the viewing terminal 960. When reproduction of one of the contents 905 on the SD card 911 is instructed thorough an instruction from the user (not shown), a reproduction control unit 917 acquires the viewing license of the target content from the license server 902 by a network interface 926.

The reproduction control unit 917 causes an SD card reading/writing unit 920 to read out the download content list 801 from the SD card 911. The reproduction control unit 917 acquires viewing time limit information on the target content from a time limit determination judgment unit 924 and compares the viewing time limit information with the present time acquired from a clock 925 to judge whether the viewing time limit is over. When the viewing time limit is not over, the reproduction control unit 917 judges that the content can be reproduced, sets a content decryption key to a decoder 918, reads out the encrypted content 905 by the SD card reading/writing unit 920, and starts decryption and reproduction.

In the license server 902, a license transmission unit 913 sends back a license corresponding to the requested content to a transmission source when a license request reception unit 912 receives a license request from the download terminal 903 or the viewing terminal 960. In such a case, when the license request reception unit 912 receives a license request including a request to determine the viewing time limit, a viewing time limit setting unit 914 determines the viewing time limit of the requested content, and the license transmission unit 913 sends back the license with the determined viewing time limit to the transmission source of the license request.

The download terminal 903 corresponds to an example of a content receiver according to the present invention. The viewing terminal 960 corresponds to an example of a content reproducer according to the present invention. The SD card 911 corresponds to an example of an exchangeable medium according to the present invention. A configuration including the reproduction control unit 907 and the SD card write control unit 910 corresponds to an example of a first control unit according to the present invention. The reproduction control unit 917 corresponds to an example of a second control unit according to the present invention. The SD card reading/writing unit 920 corresponds to an example of a read-out unit according to the present invention.

FIGS. 2(A) to 2(D) are diagrams showing the viewing licenses and the writing licenses supplied by the license server 902 to the download terminal 903 and the viewing terminal 960 in the present first embodiment.

FIG. 2(A) shows a viewing license 700 with viewing time limit which includes information on a determined viewing time limit. FIG. 2(B) shows a viewing license 701 with viewing term which includes information on a viewing time limit that has not been determined. FIG. 2(C) shows a writing license 710 with viewing time limit which includes information on a determined viewing time limit. FIG. 2(D) shows a writing license 712 with viewing term which includes information on a viewing time limit that has not been determined.

The viewing license 700 with viewing time limit includes a license type 713 indicative of a license with viewing time limit, a content ID 705 as an identifier of a target content, a pack ID 714 as a group identifier of pack content, a decryption key 702 for decoding an encrypted content, a viewing term 703 indicating a period during which the target content can be viewed, and a viewing time limit 704 indicating a determined period, for allowing the target content to be viewed, with viewing time limit start date/time and viewing time limit end date/time indicated by absolute date/time.

The same pack ID 714 is provided to each of the pack contents belonging to the same content group.

Although the configuration of the viewing license 701 with viewing term is similar to that of the viewing license 700 with viewing time limit, there are differences between the two in entry of significant values concerning the viewing term 703, the viewing time limit start, and the viewing time limit end.

A media type 711 indicating the type of medium, to which writing out is carried out, is added to the writing license 710 with viewing time limit and the writing license 712 with viewing term.

FIG. 3 shows a specific example of the download content list 800 describing information on each of the contents 905 downloaded from the content server 901 to be stored in the storage medium 921 in the download terminal 903.

Information on the downloaded content is described in the download content list 800 according to the information included in the viewing license 906 which has been acquired in downloading the content from the content server 901.

A valid/invalid flag 808 of the download content list 800 is a flag indicating whether the viewing license is in an available state. A viewing license state setting unit 922 sets validity/invalidity of the valid/invalid flag 808 in accordance with an instruction from the reproduction control unit 907 or the SD card write control unit 910.

When the viewing license is acquired from the license server 902, the valid/invalid flag 808 is set to "valid" by the viewing license state setting unit 922. Usually, when the content 905 is downloaded, the viewing license 701 with viewing term is also acquired. Therefore, when the content 905 is downloaded, information on the downloaded content 905 is written into the download content list 800 and the valid/invalid flag 808 is set to "valid."

The viewing license state setting unit 922 corresponds to an example of a viewing license invalidating unit according to the present invention. Setting the valid/invalid flag 808 to "invalid" corresponds to an example of an invalidation of a viewing license according to the present invention.

Significant values are specified in the viewing time limit start and the viewing time limit end indicating the viewing time limit 704 regarding the contents designated by entry numbers 1 and 3 of FIG. 3, which shows that the viewing time limits of these contents are already determined. On the other hand, significant values are not specified in the viewing time limit start and the viewing time limit end regarding the contents designated by entry numbers 2 and 4, and significant values are specified only in the viewing terms 703. As to these contents, although the viewing time limits are managed, the viewing time limits are not determined because the contents have never been reproduced yet by the download terminal 903 after the download from the content server 901.

FIG. 4 shows a specific example of the download content list 801 describing the information on each of the contents 905 recorded in the SD card 911, which has been written into the SD card along with the contents 905, according to the first embodiment. The download content list 801 is similar to the download content list 800, except for the presence of a valid/invalid flag 808.

Figure 5:
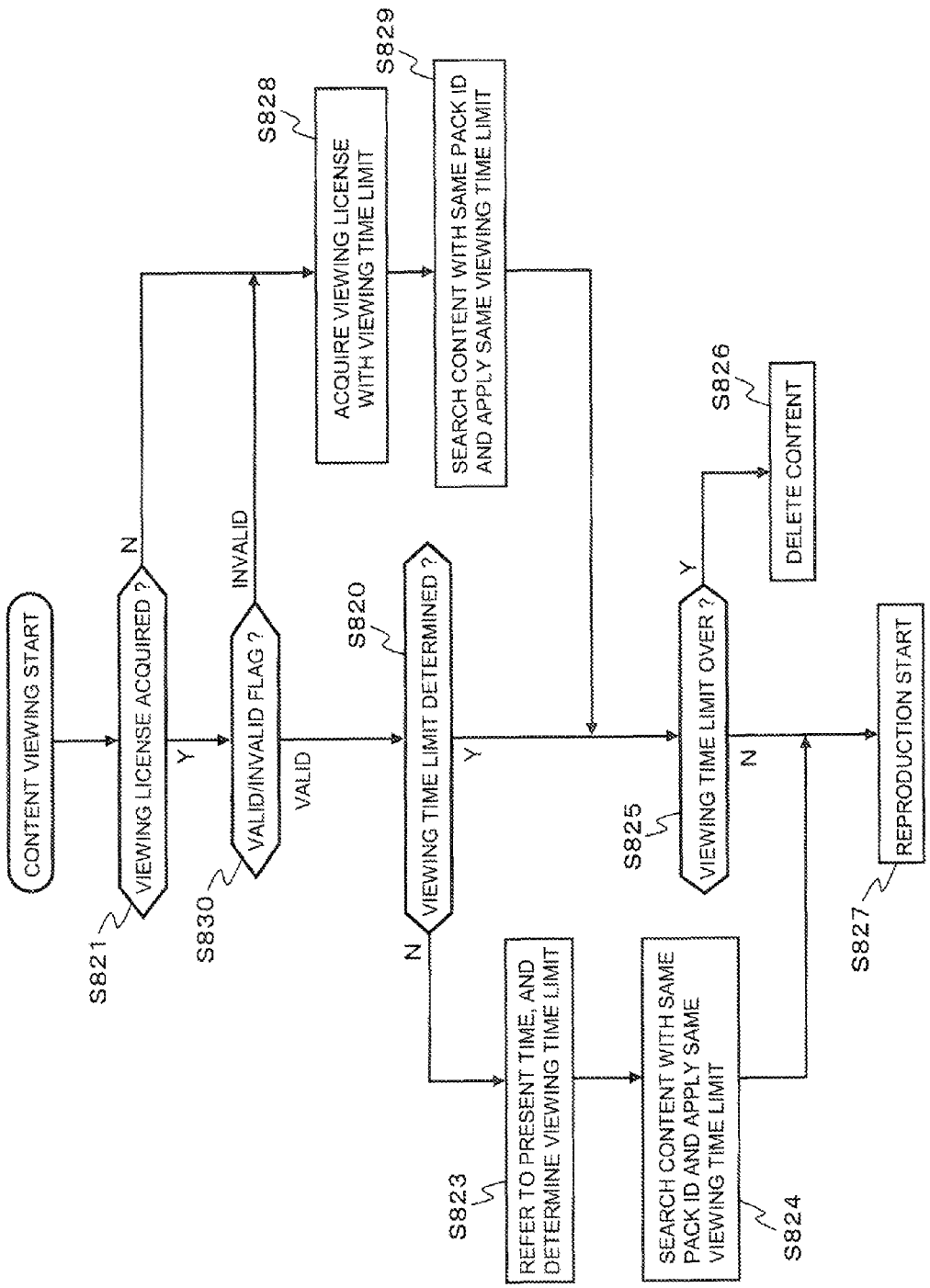
FIG. 5 is a flow chart showing a process for synchronizing the time limits of the pack contents at the start of viewing in the download terminal according to the first embodiment of the present invention.

FIG. 5 is a flow chart showing a process for synchronizing the time limits of the pack contents when the pack contents stored in the storage medium 921 are reproduced in the download terminal 903, according to the first embodiment.

Figure 6:
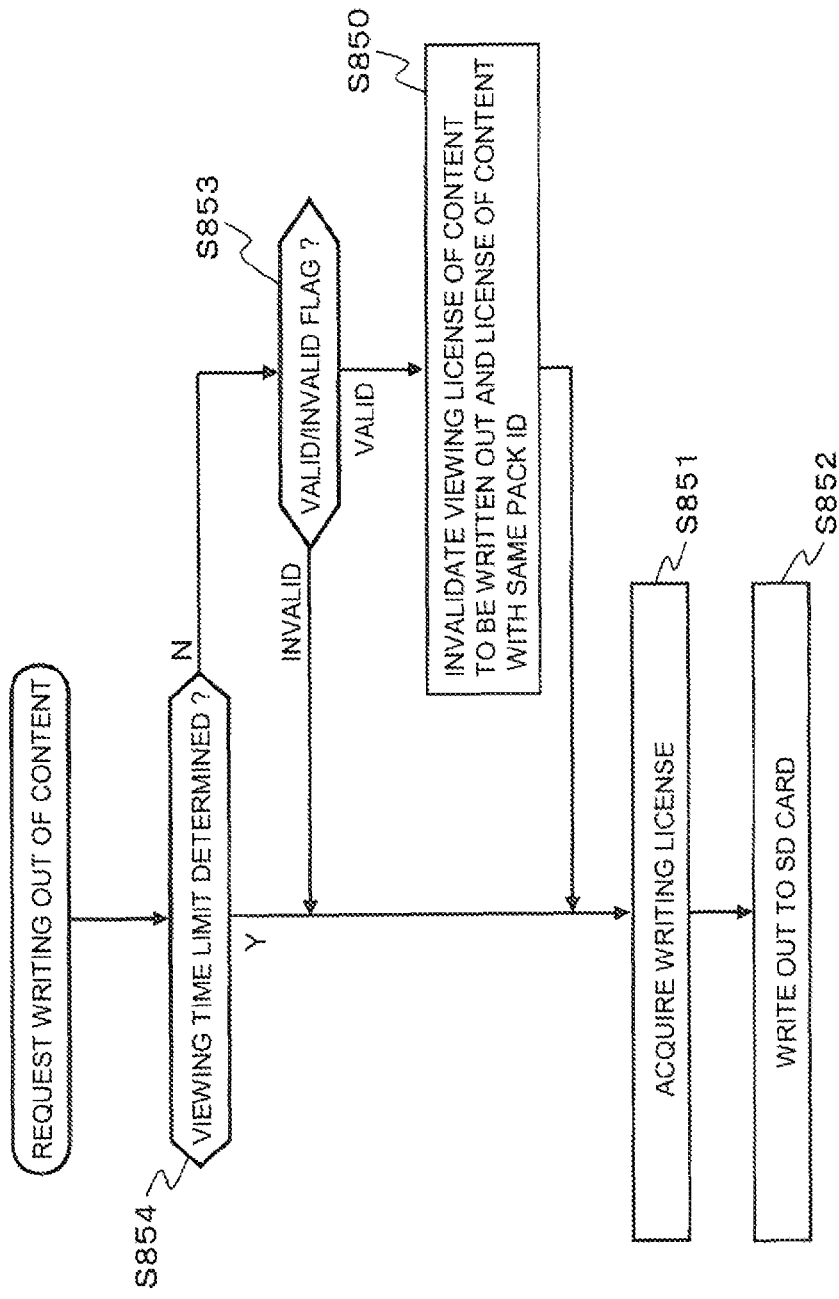
FIG. 6 is a flow chart of a process in the download terminal for writing out pack content to the SD card according to the first embodiment of the present invention.

FIG. 6 is a flow chart of a writing process for writing out, with the download terminal 903 of the first embodiment, pack content stored in the storage medium 921 to the SD card 911.

Figure 7:
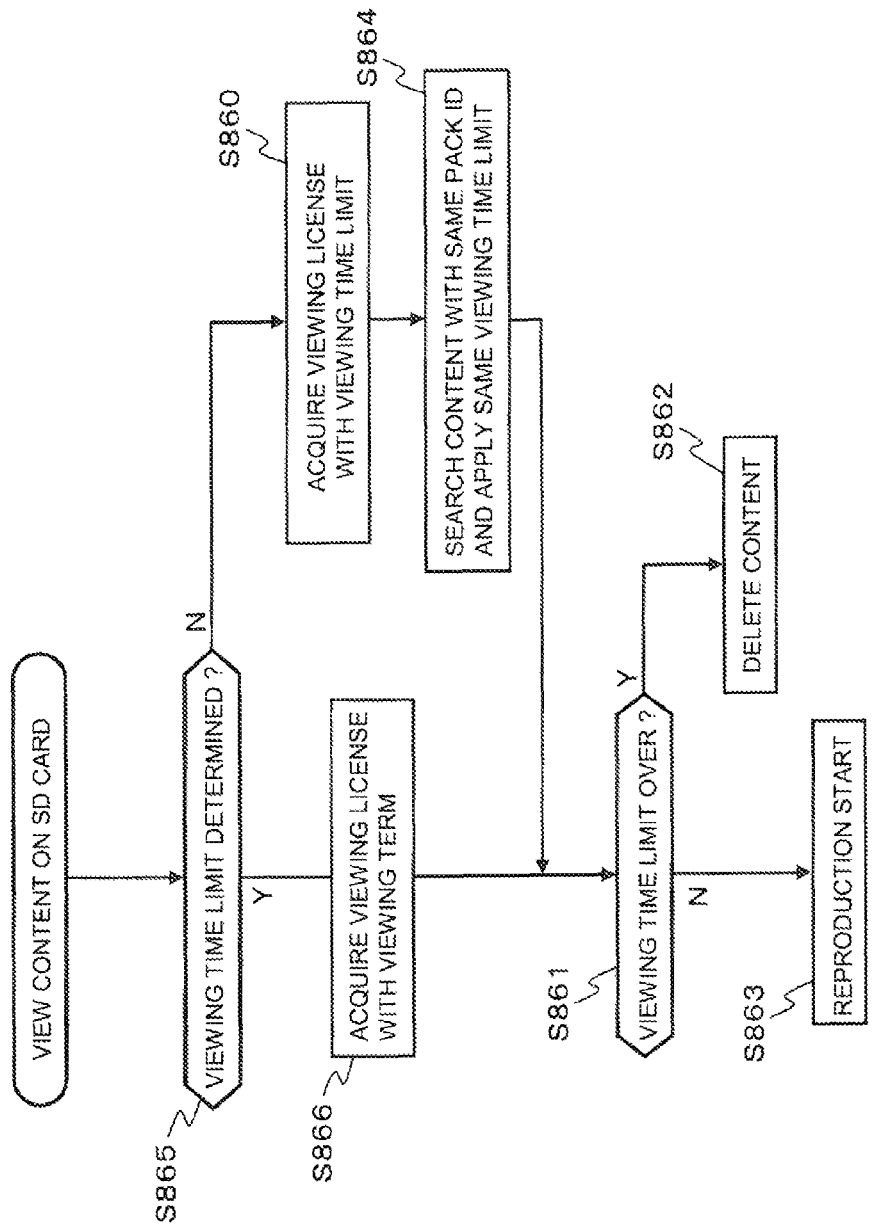
FIG. 7 is a flow chart showing a process at the start of reproduction of the pack content on the SD card in the viewing terminal according to the first embodiment of the present invention.

FIG. 7 is a flow chart of a viewing start process for viewing, with the viewing terminal 960, the content 905 recorded in the SD card 911, according to the first embodiment.

Figure 8:
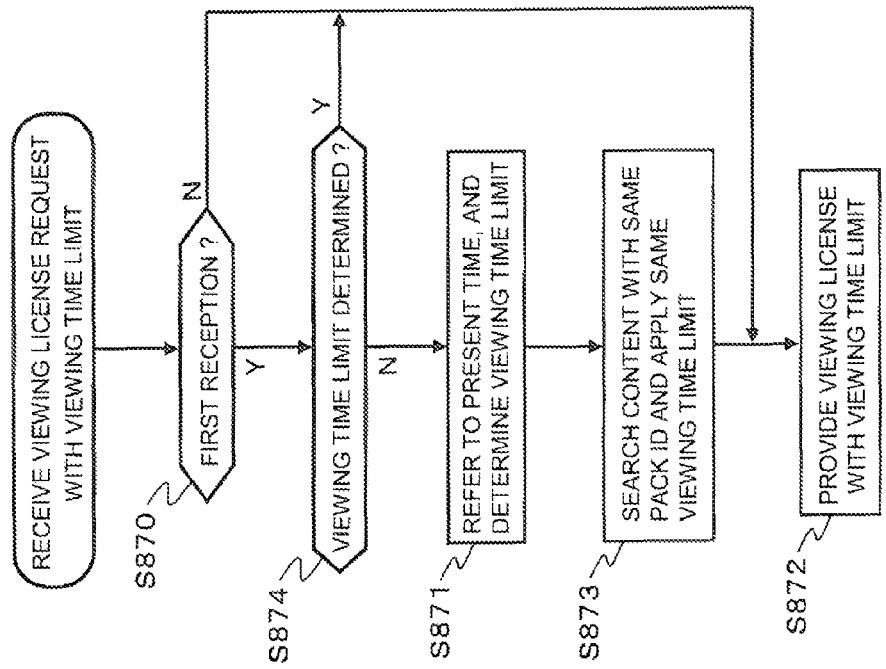
FIG. 8 is a flow chart showing a process at the reception of a viewing license request with viewing time limit in a license server according to the first embodiment of the present invention.
Figure 10:
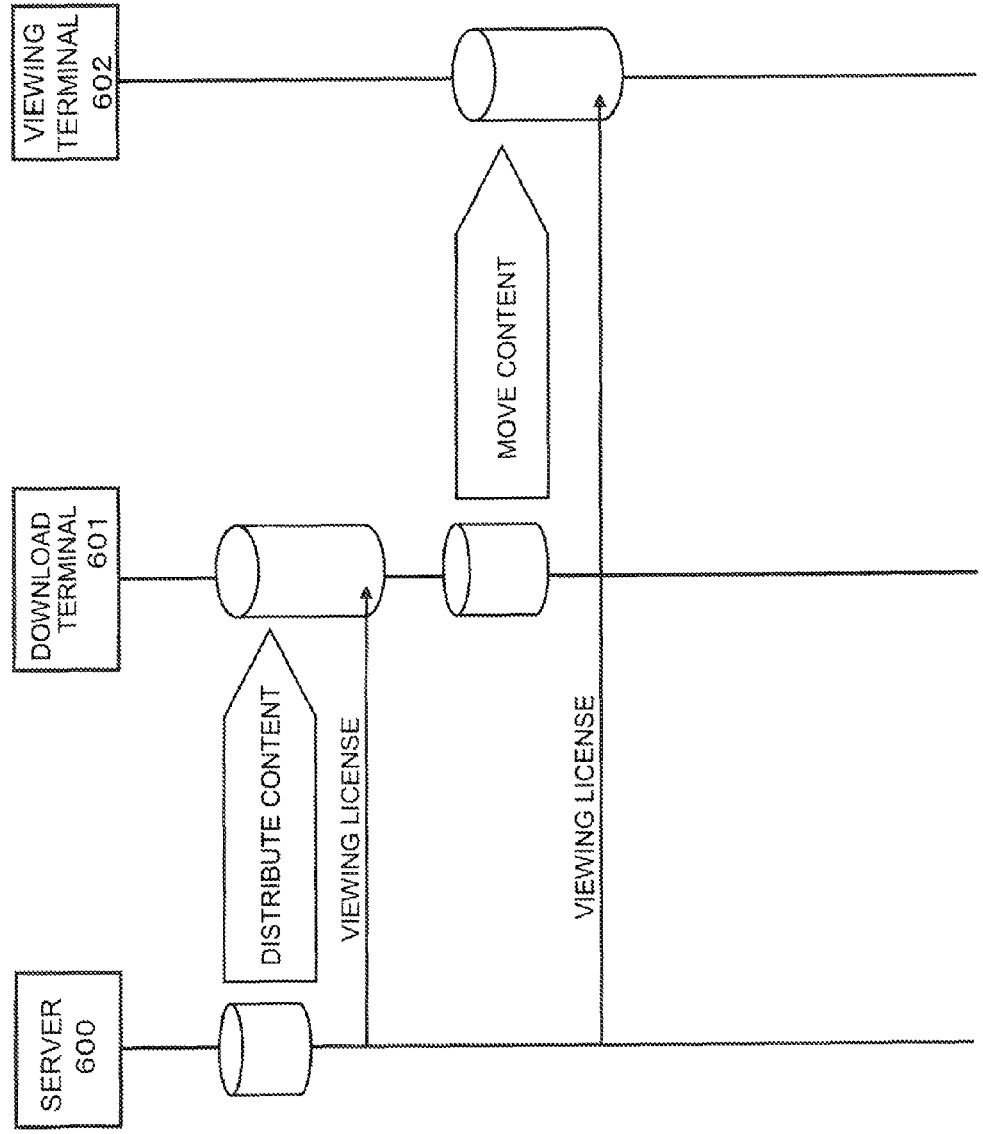
FIG. 10 is a sequence diagram showing movement of a content between terminals in conventional content downloading.
Figure 11:
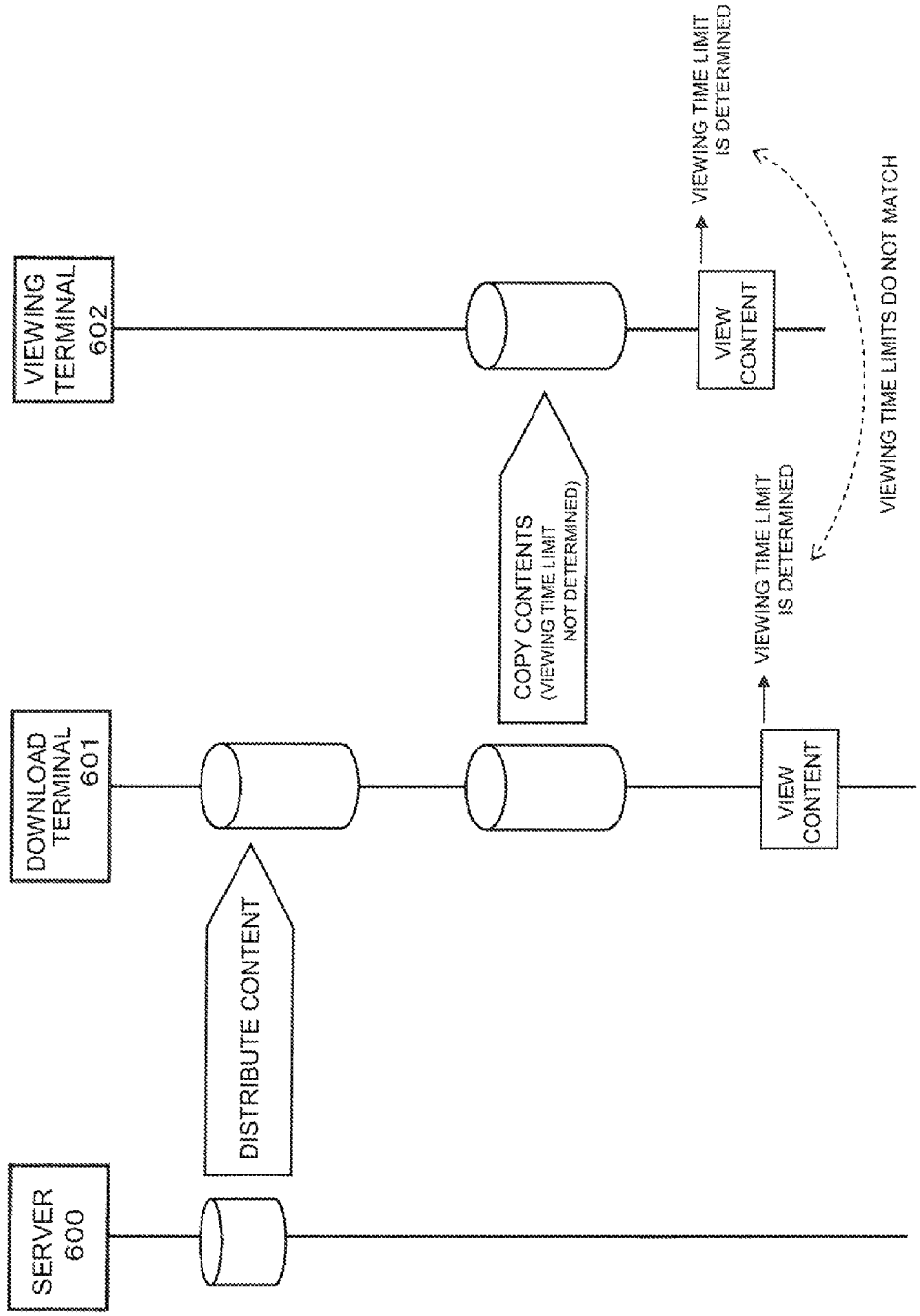
FIG. 11 is a sequence diagram showing copying of a content between terminals in conventional content downloading.
Figure 12:
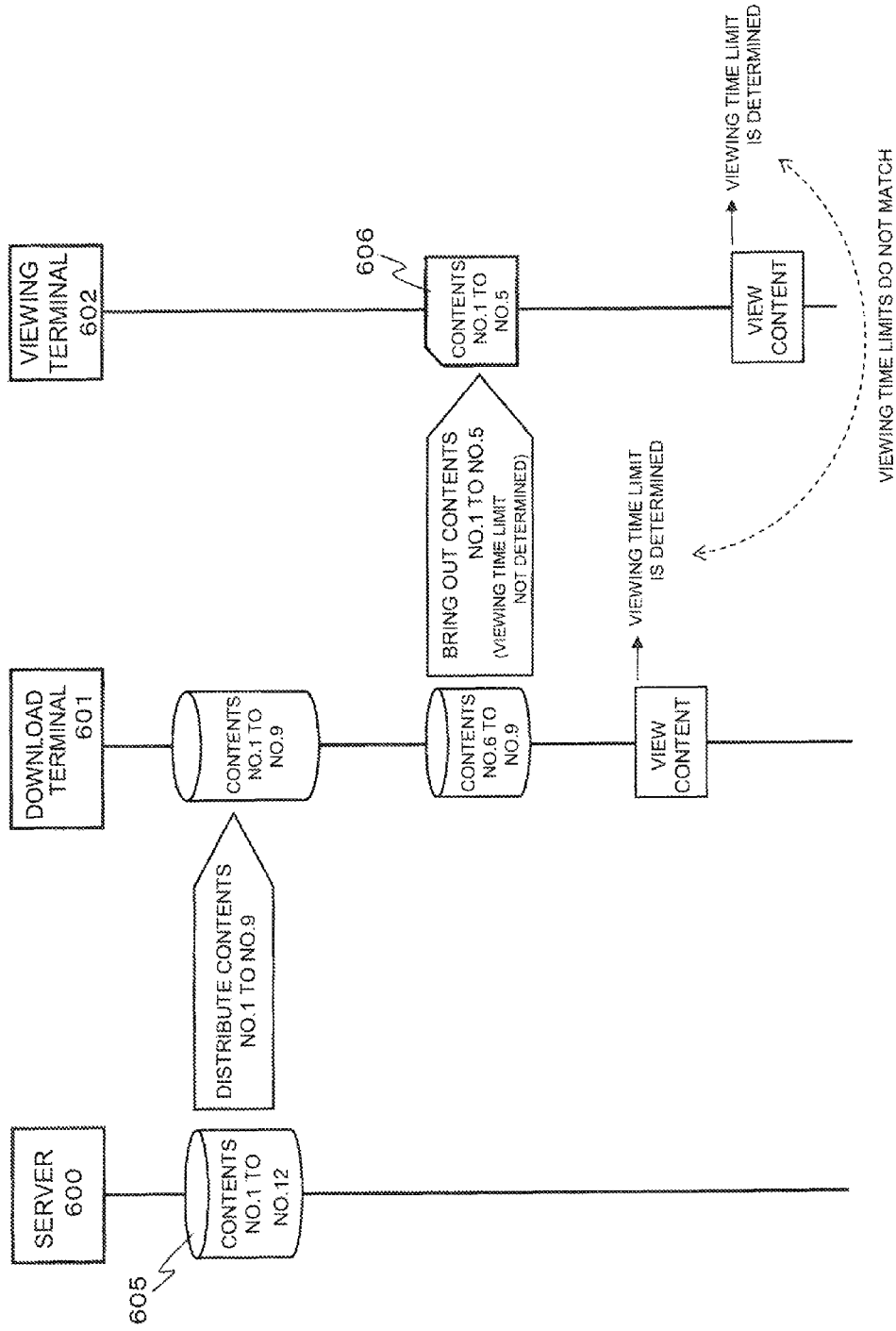
FIG. 12 is a sequence diagram showing a division view of pack content in a conventional content downloading system.

FIG. 8 is a flow chart of a viewing license providing process in the license server 902 of the first embodiment.

Operations of the content utilization system of the first embodiment for handling download contents will be described, in which the viewing time limit is not determined yet but is to be determined upon start of the first viewing.

Hereinafter, the following operations will be described one by one using FIGS. 1 to 8: (i) an operation for a content which is written out to the SD card 911 after reproduction by the download terminal 903; (ii) an operation for a content which is written out to the SD card 911 before reproduction by the download terminal 903 and then first reproduced at the viewing terminal 960; and (iii) an operation for a content which is written out to the SD card 911 before reproduction by the download terminal 903 and then first reproduced at the download terminal 903.

(i) The operation for a content which is written out to the SD card after reproduction by the download terminal.

When a content, which has been downloaded from the content server 901 to be stored in the storage medium 921, is reproduced at the download terminal 903 before the content is written out to the SD card 911, the reproduction control unit 907 in the download terminal 903 controls the reproduction in accordance with the flow shown in FIG. 5.

The reproduction control unit 907 searches the download content list 800 and checks whether the viewing license has been already acquired (step S821). When the viewing license is not acquired yet, the reproduction control unit 907 acquires the viewing license 700 with viewing time limit from the license server 902 and adds a statement to the download content list 800 (step S828). Usually, when the content 905 is downloaded, the viewing license 701 with viewing term of the content 905 is acquired. Therefore, a process of step S830 is usually performed next to a process of step S821.

When the viewing license is already acquired, the reproduction control unit 907 next judges the state of the valid/invalid flag 808 (step S830). The reproduction control unit 907 acquires the state of the valid/invalid flag 808 of the download content list 800 from the viewing license state setting unit 922. In this case, because the content which is to be reproduced is not written out to the SD card 911 yet, the state of the valid/invalid flag 808 is "valid." Next, the reproduction control unit 907 judges whether the viewing time limit of the content has been determined (step S820). The reproduction control unit 907 judges whether the viewing time limit has been determined according to the information on the viewing term 703 and the viewing time limit 704 in the download content list 800.

When the content is reproduced for the first time at the download terminal 903 in step S820, the viewing time limit is not determined yet. Thus, the reproduction control unit 907 acquires the present time information from the clock 923 to set the present time to the viewing time limit start, adds the viewing term 703 to the viewing time limit start for calculating the viewing time limit end to determine the viewing time limit 704, and writes the values into the download content list 800 (step S823).

The reproduction control unit 907 searches the download content list 800 for the contents with the same pack ID 714 as that of the content the viewing time limit of which has been just determined. When the contents with the same pack ID 714 exist, the reproduction control unit 907 specifies the same values as to the viewing time limit start and the viewing time limit end with respect to all of the contents with the same pack ID 714 (step S824).

And the reproduction control unit 907 starts the reproduction of the content (step S827).

If the content has been reproduced before at the download terminal 903, the viewing time limit has been already determined at the time of the first reproduction of the content at the download terminal 903 (step S823). In this case, it is judged that the viewing time limit of the content has been determined in step S820. The reproduction control unit 907 compares the viewing time limit 704 in the download content list 800 with the present time acquired from the clock 923 (step S825). When the viewing time limit is already over, the reproduction control unit 907 deletes the content (step S826). When the viewing time limit is not over, the reproduction control unit 907 starts the reproduction of the content (step S827).

As described above, when the content is written out to the SD card 911 after the content is reproduced at the download terminal 903, the SD card write control unit 910 of the download terminal 903 controls the writing out in accordance with the flow shown in FIG. 6.

The SD card write control unit 910 first judges whether the viewing time limit of the target content to be written out has been determined (step S854). The SD card write control unit 910 judges, based on the information on the viewing term 703 and the viewing time limit 704 of the download content list 800, whether the viewing time limit has been determined. In this case, since the download terminal 903 has reproduced the target content to be written out, the viewing time limit of the target content has been determined. Next, the SD card write control unit 910 uses the network interface 904 to acquire the writing license from the license server 902 (step S851).

The SD card write control unit 910 uses the writing license to execute a writing process to the SD card 911 (step S852). In this case, the values of the download content list 800 are copied to the respective areas of the download content list 801 to be written out to the SD card 911.

The content that has been written out to the SD card 911 by the download terminal 903 is viewed on the viewing terminal 960.

The reproduction control unit 917 in the viewing terminal 960 controls the reproduction of the content on the SD card 911 in accordance with the flow shown in FIG. 7.

When reproduction of the content recorded in the SD card 911 is instructed through an instruction from the user (not shown), the reproduction control unit 917 causes the time limit determination judgment unit 924 to judge whether the viewing time limit of the target content has been determined (step S865). The time limit determination judgment unit 924 reads out, by the SD card reading/writing unit 920, the download content list 801 recorded in the SD card 911, and judges, based on the information on the viewing term 703 and the viewing time limit 704 of the target content, whether the viewing time limit has been determined.

In this case, because the viewing time limit has been determined by the download terminal 903 (step S823), the reproduction control unit 917 acquires the viewing license 701 with viewing term of the target content from the license server 902 by the network interface 926 (step S866).

The reproduction control unit 917 judges whether the viewing time limit is over (step S861). The reproduction control unit 917 compares the determined viewing time limit acquired from the time limit determination judgment unit 924 with the present time acquired from the clock 925. When the viewing time limit is already over, the reproduction control unit 917 deletes the content (step S862). When the viewing time limit is not over, the reproduction control unit 917 starts the reproduction of the content (step S863).

In step S866 in the above, the viewing license 701 with viewing term is acquired. But the viewing license 700 with viewing time limit can be acquired instead. In this case, the viewing time limit 704 is acquired by using the viewing license 700 with viewing time limit. The judgment of whether the viewing time limit is over or not is performed according to the viewing time limit 704 recorded in the download content list 801 in the SD card 911 (step S861), not according to the viewing time limit 704 included in the viewing license 700 with viewing time limit.

(ii) The operation for a content which is written out to the SD card before reproduction by the download terminal and then first reproduced at the viewing terminal.

When a content, which has been downloaded from the content server 901 to be stored in the storage medium 921, is written out to the SD card 911 before the content is reproduced at the download terminal 903 for the first time, the SD card write control unit 910 in the download terminal 903 controls the writing out in accordance with the flow shown in FIG. 6.

The SD card write control unit 910 judges whether the viewing time limit of the target content to be written out has been determined (step S854). In this case, the viewing time limit is not determined yet because the target content to be written out has never been reproduced at the download terminal 903. Next, the SD card write control unit 910 judges the state of the valid/invalid flag 808 of all of the target contents to be written out (step S853).

The SD card write control unit 910 acquires the valid/invalid flag 808 from the viewing license state setting unit 922 which has read out the download content list 800, and the SD card write control unit 910 checks the state of the valid/invalid flag 808 of each content. When the target content is to be written out to the SD card 911 for the first time, the valid/invalid flag 808 is "valid." When the target content has been written out to the SD card 911 before and writing out of the target content is to be carried out for at least the second time, the valid/invalid flag 808 is "invalid."

When the valid/invalid flag 808 of the target content to be written out is "valid," in other words, when the license of the content is available, the SD card write control unit 910 sets the valid/invalid flag 808 of the target content to be written out in the download content list 800 to "invalid" by the viewing license state setting unit 922. At the same time, the SD card write control unit 910 sets the valid/invalid flag 808 of the contents not to be written out with the same pack ID as that of the target content to be written out to "invalid" (step S850).

The SD card write control unit 910 then transmits, to the license server 902, the writing license request of the target content to be written out, acquires the writing license from the license server 902 (step S851), and uses the writing license to control the writing out to the SD card 911 (step S852). In this case, the values of the download content list 800 are copied to the respective areas of the download content list 801 on the SD card 911.

Next, the content which has been written out to the SD card 911 by the download terminal 903 is viewed at the viewing terminal 960 before the content is reproduced at the download terminal 903 for the first time.

The reproduction control unit 917 of the viewing terminal 960 controls the reproduction of the content on the SD card 911 in accordance with the flow shown in FIG. 7.

When reproduction of the content recorded in the SD card 911 is instructed thorough an instruction from the user (not shown), the reproduction control unit 917 causes the time limit determination judgment unit 924 to judge whether the viewing time limit of the target content has been determined (step S865).

In this case, since the target content is a content written out to the SD card 911 such that the viewing time limit has not been determined by the download terminal 903, in step S865, it is judged that the viewing time limit of the content has not been determined.

Next, the reproduction control unit 917 acquires the viewing license 700 with viewing time limit of the target content from the license server 902 by the network interface 926 (step S860).

The reproduction control unit 917 writes, by the SD card reading/writing unit 920, the values of the viewing time limit start and the viewing time limit end indicating the determined viewing time limit 704, which is included in the acquired viewing license 700 with viewing time limit, into the relevant area of the download content list 801 on the SD card 911. At the same time, the reproduction control unit 917 searches the download content list 801 for the contents with the same pack ID as that of the relevant content, and specifies the values of the viewing time limit start and the viewing time limit end indicating the same viewing time limit 704 regarding all such contents on the SD card 911 (step S864).

The reproduction control unit 917 then compares the viewing time limit 704 written into the download content list 801, which is included in the viewing license 700 with viewing time limit acquired from the license server 902, with the present time acquired from the clock 925 (step S861). When the viewing time limit is already over, the reproduction control unit 917 deletes the content on the SD card 911 (step S862). When the viewing time limit is not over, the reproduction control unit 917 starts the reproduction of the content (step S863).

Next, a determination operation of the viewing time limit in the license server 902, which receives a viewing license request with viewing time limit from the viewing terminal 960 in step S860, is described.

The license server 902 that has received a viewing license request with viewing time limit checks and determines the viewing time limit of the requested content in accordance with the flow shown in FIG. 8, and sends back the viewing license 700 with viewing time limit including the determined viewing time limit information (the viewing time limit 704) to the transmission source terminal which transmitted the viewing license request with viewing time limit.

When receiving the viewing license request with viewing time limit from the download terminal 903 or the viewing terminal 960, the license server 902 checks, from the history information (not shown) on the license server 902 based on the content ID 705, whether the license request including the determination request of the viewing time limit for the content designated by the viewing license request with viewing time limit is received for the first time or not (step S870).

In this case, the target content has not yet been reproduced by the download terminal 903. Therefore, the reception of the viewing license request with viewing time limit from the viewing terminal 960 is the first reception of the license request including the determination request of the viewing time limit and, in step S870, it is judged that the reception is the first reception. The history information (not shown) on the license server 902 is then searched for the information on whether the viewing time limit of the target content is already determined (step S874). Even if a viewing license request with viewing time limit for the target content is received for the first time, the viewing time limit of the target content has been already determined when the viewing license request with viewing time limit of a content with the same pack ID as that of the target content has been received before (step S873). Therefore, in such a case, the viewing time limit of the target content has been already determined.

When, in step S874, it is judged that the viewing time limit of the target content has not been determined, the license server 902 sets the present time to the viewing time limit start and adds the viewing term to the viewing time limit start for calculating the viewing time limit end to determine the viewing time limit of the target content (step S871). At the same time, the same viewing time limits are similarly determined for all contents with the same pack ID as that of the target content (step S873).

The license server 902 then sends back the viewing license 700 with viewing time limit including the determined viewing time limit 704 to the terminal which transmitted the viewing license request with viewing time limit (step S872). That is, in this case, the license server 902 sends back the viewing license 700 with viewing time limit to the viewing terminal 960.

When the viewing time limit of the target content is already determined in step S874, the viewing license 700 with viewing time limit including the viewing time limit 704 that has been determined before is sent back to the viewing terminal 960 (step S872).

The viewing license request with viewing time limit which is transmitted to the license server 902 for determination of the viewing time limit by the license server 902 corresponds to an example of a viewing license request including a request of determining viewing time limit according to the present invention.

Next, an operation is described for reproducing a content stored in the storage medium 921, which is the same as the content recorded in the SD card 911, at the download terminal 903 for the first time. The reproduction control unit 907 in the download terminal 903 controls the reproduction in accordance with the flow shown in FIG. 5.

The reproduction control unit 907 searches the download content list 800 and checks whether the viewing license has been already acquired (step S821). In this case, because the viewing license with viewing time limit of the content has been already acquired, the process of step S830 is performed next.

Next, the reproduction control unit 907 acquires the valid/invalid flag 808 on the download content list 800 from the viewing license state setting unit 922 and judges the state of the valid/invalid flag 808 (step S830). In this case, the valid/invalid flag 808 is set to "invalid" since the content has been written out to the SD card 911 before (step S850). Therefore, the reproduction control unit 907 judges that the viewing license of the content is not available, and performs the process of step S828 next.

In step S828, the reproduction control unit 907 transmits, to the license server 902, the viewing license request with viewing time limit by the network interface 904, and the reproduction control unit 907 acquires, from the license server 902, the viewing license 700 with viewing time limit including the viewing time limit 704 determined by the license server 902.

The reproduction control unit 907 writes the values of the viewing time limit start and the viewing time limit end indicating the determined viewing time limit 704, which is included in the acquired viewing license 700 with viewing time limit, into the relevant area of the download content list 800. And the reproduction control unit 907 sets the valid/invalid flag 808 to "valid" by the viewing license state setting unit 922. At the same time, the reproduction control unit 917 searches the download content list 800 for the contents with the same pack ID as that of the relevant content, and performs the same process to all such contents stored in the storage medium 921 (step S829).

The reproduction control unit 907 then compares the viewing time limit 704, which has been acquired from the license server 902 and written into the download content list 800, with the present time acquired from the clock 923 (step S825). When the viewing time limit is already over, the reproduction control unit 907 deletes the content (step S826). When the viewing time limit is not over, the reproduction control unit 907 starts the reproduction of the content (step S827).

Next, a determination operation of the viewing time limit in the license server 902, which receives the viewing license request with viewing time limit from the download terminal 903 in step S828, is described.

The license server 902 that has received a viewing license request with viewing time limit checks and determines the viewing time limit of the requested content in accordance with the flow shown in FIG. 8, and sends back the viewing license 700 with viewing time limit including the determined viewing time limit information (the viewing time limit 704) to the download terminal 903 which transmitted the viewing license request with viewing time limit.

When receiving the viewing license request with viewing time limit from the download terminal 903, the license server 902 judges whether the license request including the determination request of the viewing time limit for the content designated by the viewing license request with viewing time limit is received for the first time or not (step S870). Because the license server 902 has received a viewing license request with viewing time limit for the content from the viewing terminal 960 before, it is judged that the viewing license request with viewing time limit, which has been just received from the download terminal, is not the viewing license request received for the first time. And the license server 902 performs the process of step S872 next.

The license server 902 extracts, from the history information on the license server 902, the information (the viewing time limit 704) on the determined viewing time limit which was determined when the viewing license request with viewing time limit was received from the viewing terminal 960. The license server 902 sends back the viewing license 700 with viewing time limit including the viewing time limit 704 that has been determined before to the download terminal 903 which transmitted the viewing license request with viewing time limit.

The same viewing time limit information as that on the viewing time limit 704 included in the viewing license 700 with viewing time limit, which was, by the license server 902, determined and sent back to the viewing terminal 960 when the viewing terminal 960 transmitted the viewing license request with viewing time limit, is sent back for the viewing license request with viewing time limit which has been just transmitted from the download terminal 903. Therefore, the viewing time limit of the content 905 in the SD card 911 reproduced at the viewing terminal 960 can be synchronized with the viewing time limit of the related content 905 reproduced at the download terminal 903.

(iii) The operation for a content which is written out to the SD card before reproduction by the download terminal and then first reproduced at the download terminal.

The above description for case (ii) can be applied to case (iii) regarding the operations of the "processes for downloading a content from the content server 901, storing the content in the storage medium 921, and writing out the content to the SD card 911 before reproduction of the content at the download terminal 903" described by using FIG. 6, the "processes for reproducing the content at the viewing terminal 960" described by using FIG. 7, and the "processes for reproducing the content at the download terminal 903" described by using FIG. 5.

In case (iii), before the content is reproduced at the viewing terminal 960, a related content is reproduced at the download terminal 903 for the first time. Therefore, when the license server 902 receives the viewing license request with viewing time limit from the download terminal 903 or the viewing terminal 960, the relevant operation of the license server 902 differs from the corresponding operation in case (ii).

The license server 902 that has received a viewing license request with viewing time limit acts in accordance with the flow shown in FIG. 8.

In this case, the license server 902 receives a viewing license request with viewing time limit from the download terminal 903 before receiving a viewing license request with viewing time limit from the viewing terminal 960. Therefore, when receiving the viewing license request with viewing time limit from the download terminal 903, the license server 902 judges, in step S870, that the reception is the first reception.

When, in step S874, it is judged that the viewing time limit is not determined yet, the license server 902 determines the viewing time limit of the content, which has been requested to be determined, based on the present time (step S871), and sends back the viewing license 700 with viewing time limit including the determined viewing time limit 704 to the download terminal 903 (step S872).

When the license server 902 receives the viewing license request with viewing time limit from the viewing terminal 960 after that time, in step S870, it is judged that the license request is not received for the first time, because the license server 902 has received the viewing license request with viewing time limit from the download terminal 903 before.

The license server 902 then sends back, to the viewing terminal 960, the viewing license 700 with viewing time limit which includes the same viewing time limit information as that on the viewing time limit 704, which was determined when the license server 902 received the viewing license request with viewing time limit from the download terminal 903 (step S872).

The same viewing time limit information as that on the viewing time limit 704 included in the viewing license 700 with viewing time limit, which was, by the license server 902, determined and sent back to the download terminal 903 when the download terminal 903 transmitted the viewing license request with viewing time limit, is included in the viewing license 700 with viewing time limit the license server 902 sends back for the viewing license request with viewing time limit from the viewing terminal 960. Therefore, the viewing time limit of the content 905 reproduced at the download terminal 903 can be synchronized with the viewing time limit of the related content 905 in the SD card 911 reproduced at the viewing terminal 960.

As described above, in the content utilization system of the first embodiment, even if the pack contents are decentralized in the download terminal 903 and the SD card 911, the download terminal 903 and the viewing terminal 960 certainly transmit the viewing license request with viewing time limit to the license server 902 when a content the viewing time limit of which is not determined is reproduced. When one of the terminals transmits the viewing license request with viewing time limit for the first time, then the viewing time limit 704 is determined based on the time at which the license server 902 has received the viewing license request with viewing time limit, which is to be inserted in the viewing license 700 with viewing time limit sent back to another terminal afterward. In the whole pack, the viewing time limit is thus determined based on the time at which one of the pack contents is reproduced for the first time.

In the above, when the reproduction of a content is started, the viewing license request with viewing time limit is transmitted to the license server 902 in order to determine the viewing time limit of the content. A viewing license request with viewing term can be transmitted in order to inquire of the license server 902 whether the viewing time limit has been determined about the content the viewing time limit of which is not determined. The viewing license request with viewing term which is transmitted in order to inquire whether the viewing time limit has been determined corresponds to an example of a determination inquiry request according to the present invention.

Figure 9:
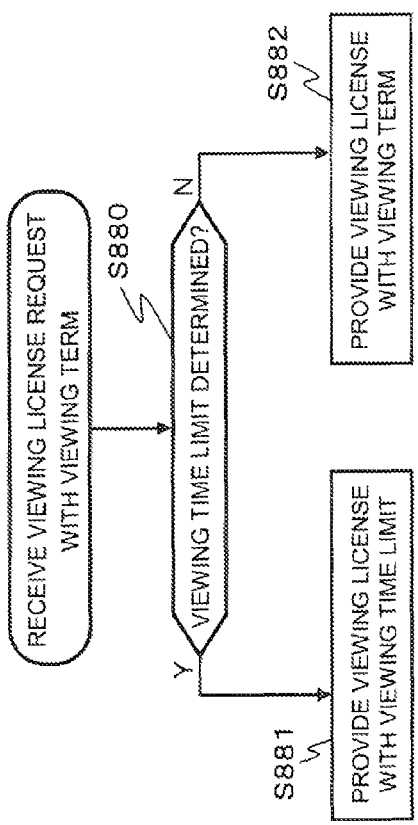
FIG. 9 is a flow chart showing a process at the reception of a viewing license request with viewing term in the license server according to the first embodiment of the present invention.

FIG. 9 is a flow chart of a process for providing a viewing license in the license server 902 when the license server 902 receives a viewing license request with viewing term.

When the license server 902 receives a viewing license request with viewing term from the download terminal 903 or the viewing terminal 960, the license server 902 searches the history information (not shown) on the license server 902 to check whether the viewing time limit of the content is already determined (step S880). When the viewing time limit is already determined, the license server 902 sends back the viewing license 700 with viewing time limit to the transmission source terminal (step S881). When the viewing time limit is not determined, the license server 902 sends back the viewing license 701 with viewing term to the transmission source terminal (step S882).

A user can check the determination state of the viewing time limit of a content, which is in a state where the viewing time is not determined, by using the viewing license request with viewing term. For example, when a content has been brought out by the SD card 911 by a user, the user who is going to view the content at the viewing terminal 960 does not know when another user starts to view the same content at the download terminal 903. Even if another user starts to view the content, the user can check the viewing time limit of the content by using the viewing license request with viewing term. Thereby, the viewing time limit can be prevented from being over so that the user, who views the content at the viewing terminal 960, does not fail to view the content. The user can also consider a viewing schedule by checking the viewing time limit.

In the first embodiment, the valid/invalid flag 808 is managed to be set, which is an example of a method of invalidating the viewing license in the download terminal 903. When, instead of using the valid/invalid flag 808, the viewing license is invalidated by deleting the viewing license once and the viewing license with viewing time limit is acquired afterward, the same effect is produced. The present invention inevitably requires reacquisition of the viewing license when the valid/invalid flag 808 is set invalid or the viewing license is discarded.

In a case where the viewing license is invalidated by discarding the viewing license once, the decryption key of the content is deleted as well since the viewing license is discarded. When the content is reproduced after that time, the viewing license is inevitably acquired again to acquire the decryption key.

In a case where the invalidation of the viewing license is realized by discarding the viewing license once, a judgment of the existence of the viewing license is performed instead of the judgment process for the valid/invalid flag 808 at step S830 in FIG. 5 and at step S853 in FIG. 6. In this case, the process of step S821 in FIG. 5 becomes unnecessary.

As described above, in the present invention, the viewing time limit of a part of the pack contents, which are written out to an exchangeable medium, can be synchronized with the viewing time limit of the remainder of the pack contents, which are left on the download terminal. It is also an advantage of the present invention that the time limit of pack rental content can be determined at the time of the first reproduction even when the content is brought out by the exchangeable medium to be viewed.

The synchronization of the time limits of the decentralized pack contents is described in the first embodiment. However, even if the content is not a content of the pack contents, for example, when a rental content in a state in which the content can be viewed is left in the download terminal 903 and is further copied to the SD card 911, the viewing time limit of the content in the download terminal 903 can be synchronized, by the same method, with the viewing time limit of the content on the SD card 911.

When the functions of the reproduction control unit 907, the SD card write control unit 910, the viewing license state setting unit 922 and the like in the download terminal 903 are performed by software which executes a program by using a CPU, a change of a format of the data received from the server, a change of a format of the data stored in the storage medium 921, etc. can be supported flexibly compared with the changes concerning those functions performed only by hardware. When the functions of the reproduction control unit 917, the SD card reading/writing unit 920, the time limit determination judgment unit 924 and the like in the viewing terminal 960 are performed by software, a specification change or the like can be supported flexibly compared with the changes concerning those functions performed only by hardware.

The non-transitory computer-readable medium of the present invention is a recording medium having recorded thereon a program of functions of the above-described content receiver of the present invention and is a recording medium the program of which, when read, is used in cooperation with the computer.

The computer according to the present invention described above is not limited to pure hardware such as a CPU and may include firmware, an OS, and peripheral equipment.

As described above, the configuration of the present invention may be realized in terms of software or may be realized in terms of hardware.

The content receiver, the license server, the content utilization system, the content viewing time limit management method, and the like according to the present invention have an effect of synchronizing viewing time limits of a plurality of contents even if some of the plurality of contents that need to have the same viewing time limits are written out to an exchangeable medium before the viewing time limits are determined, and are useful as a content receiver, a license server, a content utilization system, a content viewing time limit management method and the like for copying and bringing out an encrypted content with managed viewing time limit from a content receiver to an exchangeable medium and for reproducing the encrypted content by a reproducer.

What is claimed is:

1. A content receiver that receives a content, for which a viewing time limit is managed, from a content server, and that writes out the content to a non-transitory exchangeable medium, the content receiver comprising:
   a viewing license invalidating unit that invalidates a viewing license of the content; and
   a first control unit that (i) judges whether the viewing license is valid, (ii) judges whether the viewing time limit of the content is determined, (iii) writes out the content to the exchangeable medium, and (iv) reproduces the content,
   wherein when the first control unit judges that the viewing license is valid and the viewing time limit of the content is not determined, the first control unit (i) causes the viewing license invalidating unit to invalidate the viewing license before writing out the content to the exchangeable medium, and (ii) writes out information indicating that the viewing time limit of the content is not determined to the exchangeable medium, and
   wherein after the first control unit writes out the viewing time limit of the content to the exchangeable medium, the first control unit (i) transmits a viewing license request, which includes a request of determining the viewing time limit of the content, to a license server, (ii) receives a determined viewing time limit of the content and the viewing license from the license server, and (iii) reproduces the content.

2. The content receiver according to claim 1,
   wherein when the first control unit writes out the content to the exchangeable medium before reproducing the content, (i) if the first control unit judges that the viewing license is valid and the viewing time limit of the content is not determined, the first control unit causes the viewing license invalidating unit to invalidate the viewing license, and writes out the non-determined viewing time limit of the content to the exchangeable medium, and (ii) if the first control unit judges that the viewing license is invalid and the viewing time limit of the content is not determined, the first control unit writes out the information indicating that the viewing time limit of the content is not determined to the exchangeable medium, and
   wherein when the first control unit reproduces the content, (i) if the first control unit judges that the viewing license is valid and the viewing time limit of the content is not determined, the first control unit determines the viewing time limit of the content by setting a present time as a starting time of the viewing time limit of the content, and after the first control unit determines the viewing time limit of the content, when the first control unit writes out the content to the exchangeable medium, the first control unit writes out the determined viewing time limit of the content to the exchangeable medium, and (ii) if the first control unit judges that the viewing license is invalid and the viewing time limit of the content is not determined, the first control unit transmits the viewing license request, which includes the request of determining the viewing time limit of the content, to the license server, and receives the determined viewing time limit of the content and the viewing license from the license server, and after the first control unit receives the determined viewing time limit of the content and the viewing license from the license server, when the first control unit writes out the content to the exchangeable medium, the first control unit writes out the received and determined viewing time limit of the content to the exchangeable medium.

3. The content receiver according to claim 2,
   wherein when a content reproducer reads the content and the viewing time limit of the content recorded on the exchangeable medium and reproduces the content, (i) when a second control unit, which is included in the content reproducer, judges that the viewing time limit of the content is determined, the second control unit controls the reproduction of the content according to the determined viewing time limit of the content, and (ii) when the second control unit judges that the viewing time limit of the content is not determined, the second control unit transmits the viewing license request, which includes the request of determining viewing time limit of the content, to the license server, receives the determined viewing time limit of the content from the license server, and controls the reproduction of the content according to the received and determined viewing time limit of the content, and
   wherein when the license server receives the viewing license request, (i) when the viewing time limit of the content is not determined yet, the license server determines the viewing time limit of the content and transmits the determined viewing time limit of the content to the content receiver or the content reproducer from which the viewing license request is received, and (ii) when the viewing time limit of the content is already determined, the license server transmits the already determined viewing time limit of the content to the content receiver or the content reproducer from which the viewing license request is received.

4. The content receiver according to claim 3,
   wherein when the first control unit invalidates the viewing license of the content, the first control unit invalidates a viewing license of first other content, the first other content belonging to a same content group to which the content belongs, and (i) when the first control unit judges that the viewing time limit of the content is not determined, the first control unit sets a viewing time limit of the first other content as the same as the viewing time limit of the content, and (ii) when the content receiver receives the already determined viewing time limit of the content from the license server, the first control unit sets the viewing time limit of the first other content as the same as the already determined viewing time limit of the content, and
   wherein when the content reproducer receives the determined viewing time limit of the content from the license server and if second other content is recorded on the exchangeable medium, the content reproducer records the determined viewing time limit of the content as a viewing time limit of the second other content, the second other content belonging to a same content group to which the content belongs, and wherein when the license server determines the viewing time limit of the content, the license server sets a viewing time limit of third other content as the same as the determined viewing time limit of the content, the third other content belonging to a same content group to which the content belongs.

5. The content receiver according to claim 3, wherein the first control unit included in the content receiver and the second control unit included in the content reproducer are operable to transmit, to the license server, a determination inquiry request which inquires whether the viewing time limit of the content is determined in the license server when the viewing time limit of the content is not determined.

6. The content receiver according to claim 2, wherein when the first control unit judges that the viewing time limit of the content is not determined, the license invalidating unit invalidates the viewing license by discarding the viewing license, and wherein when the first control unit reproduces the content and if the viewing license is discarded, (i) the first control unit performs control so that the viewing license is acquired from the license server, (ii) the content, which is encrypted, is decrypted by using a decryption key included in the viewing license, and (iii) the content is reproduced.

7. The content receiver according to claim 1, wherein the viewing license invalidating unit invalidates the viewing license of the content by setting a valid/invalid flag corresponding to the content to invalid, the valid/invalid flag being included in a download content list stored in the content receiver.

8. A content utilization system comprising:
a content receiver that receives a content, a viewing time limit of which is managed, from a content server and that writes out the content to an exchangeable medium;
a content reproducer that reproduces the content recorded on the exchangeable medium; and
a license server that supplies a viewing license of the content,
wherein the content receiver includes:
a viewing license invalidating unit that invalidates the viewing license of the content; and
a first control unit that (i) judges whether the viewing license is valid, (ii) judges whether the viewing time limit of the content is determined, (iii) writes out the content to the exchangeable medium, and (iv) reproduces the content,
wherein when the first control unit reproduces the content, (i) if the first control unit judges that the viewing license is valid and the viewing time limit of the content is not determined, the first control unit determines the viewing time limit of the content by setting a present time as a starting time of the viewing time limit of the content, and after the first control unit determines the viewing time limit of the content, when the first control unit writes out the content to the exchangeable medium, the first control unit writes out the determined viewing time limit of the content to the exchangeable medium, and (ii) if the first control unit judges that the viewing license is invalid and the viewing time limit of the content is not determined, the first control unit transmits a viewing license request, which includes a request of determining the viewing time limit of the content, to the license server, and receives the determined viewing time limit of the content and the viewing license from the license server, and after the first control unit receives the determined viewing time limit of the content and the viewing license from the license server, when the first control unit writes out the content to the exchangeable medium, the first control unit writes out the received and determined viewing time limit of the content to the exchangeable medium, wherein when the first control unit writes out the content to the exchangeable medium before reproducing the content, (i) if the first control unit judges that the viewing license is valid and the viewing time limit of the content is not determined, the first control unit invalidates the viewing license and writes out information indicating that the viewing time limit of the content is not determined to the exchangeable medium, and (ii) if the first control unit judges that the viewing license is invalid and the viewing time limit of the content is not determined, the first control unit writes out the information indicating that the viewing time limit of the content is not determined to the exchangeable medium, wherein the content reproducer includes:
a read-out unit which reads the content and the viewing time limit of the content that are recorded on the exchangeable medium;
a time limit determination judgment unit which judges whether the viewing time limit of the content read by the read-out unit has been determined or not; and
a second control unit that reproduces the content,
wherein when the time limit determination judgment unit judges that the viewing time limit of the content is determined, the second control unit controls the reproduction of the content according to the determined viewing time limit of the content,
wherein when the time limit determination judgment unit judges that the viewing time limit of the content is not determined, the second control unit transmits the viewing license request, which includes the request of determining the viewing time limit of the content, to the license server, receives the determined viewing time limit of the content from the license server, and controls the reproduction of the content according to the received and determined viewing time limit of the content,
wherein the license server includes:
a viewing time limit setting unit that determines the viewing time limit of the content when the license server receives the viewing license request; and
a license transmit unit that transmits the viewing license to the content receiver or the content reproducer from which the viewing license request is received, and
wherein when the license server receives the viewing license request, (i) if the viewing time limit of the content is not determined yet, the viewing time limit setting unit determines the viewing time limit of the content by setting a present time as a starting time of the viewing time limit of the content and the license transmit unit transmits the viewing time limit of the content determined by viewing time limit setting unit to the content receiver or the content reproducer from which the viewing license request is received and (ii) if the viewing time limit of the content is already determined, the license transmit unit transmits the already determined viewing time limit of the content to the content receiver or the content reproducer from which the viewing license request is received.

9. A non-transitory computer-readable medium having a program stored thereon, wherein the program causes a computer to function as a content receiver that receives a content, for which a viewing time limit is managed, from a content server and that writes out the content to an exchangeable medium, the content receiver comprising:

a viewing license invalidating unit that invalidates a viewing license of the content by setting a valid/invalid flag corresponding to the content to invalid, the valid/invalid flag being included in a download content list stored in the content receiver; and a first control unit that (i) judges whether the viewing license is valid based on the valid/invalid flag corresponding to the content, (ii) judges whether the viewing time limit of the content is determined, (iii) writes out the content to the exchangeable medium, and (iv) reproduces the content, wherein when the first control unit writes out the content to the exchangeable medium before reproducing the content, (i) if the first control unit judges that the viewing license is valid and the viewing time limit of the content is not determined, the first control unit causes the viewing license invalidating unit to invalidate the viewing license, and writes out information indicating that the viewing time limit of the content has not been determined to the exchangeable medium, and (ii) if the first control unit judges that the viewing license is invalid and the viewing time limit of the content is not determined, the first control unit writes out the information indicating that the viewing time limit of the content is not determined to the exchangeable medium, and wherein when the first control unit reproduces the content, (i) if the first control unit judges that the viewing license is valid and the viewing time limit of the content is not determined, the first control unit determines the viewing time limit of the content by setting a present time as a starting time of the viewing time limit of the content, and after the first control unit determines the viewing time limit of the content, when the first control unit writes out the content to the exchangeable medium, the first control unit writes out the determined viewing time limit of the content to the exchangeable medium, and (ii) if the first control unit judges that the viewing license is invalid and the viewing time limit of the content is not determined, the first control unit transmits a viewing license request, which includes a request of determining the viewing time limit of the content, to the license server, and receives a determined viewing time limit of the content and the viewing license from the license server, and after the first control unit receives the determined viewing time limit of the content and the viewing license from the license server, when the first control unit writes out the content to the exchangeable medium, the first control unit writes out the received and determined viewing time limit of the content to the exchangeable medium.

* * * * *